COMPARATOR SYSTEMS

Filed Nov. 27, 1962 2 Sheets-Sheet 1

INVENTORS
HENRY S. ZIEPER &
WILLIAM E. WOODS &
LARRY W. VINCENT
BY John V. Regan
ATTORNEY

COMPARATOR SYSTEMS

Filed Nov. 27, 1962 2 Sheets-Sheet 2

INVENTORS
HENRY S. ZIEPER &
WILLIAM E. WOODS &
LARRY W. VINCENT
By John V. Regan
ATTORNEY United States Patent Office 3,241,114
Patented Mar. 15, 1966

3,241,114
COMPARATOR SYSTEMS

Henry S. Zieper, Canoga Park, William E. Woods, Northridge, and Larry W. Vincent, Van Nuys, Calif., assignors to Radio Corporation of America, a corporation of Delaware Filed Nov. 27, 1962, Ser. No. 240,237
6 Claims. (Cl. 340—146.2)

This invention relates to comparator systems, and particularly to systems for comparing ordered sets of binary digits.

Systems for comparing binary numbers are often used in applications which require a determination between the absolute magnitude or the relative magnitude of the two numbers. For example, such comparators are used in analog-digital and digital-analog conversion systems, digital positioning systems, information matching systems, and so on. Prior art comparing systems have employed various logical arrangements for comparing the two numbers. In general, these prior art arrangements involve a relatively complex arrangement of logic circuits such as "exclusive-or" circuits and the like. Further, many of these prior systems require an unduly long time period between the application of the numbers to be compared and the final output signals. For example, two or more gate delays per pair of compared digits may be required thereby greatly reducing the operating speed of the system.

It is an object of the present invention to provide improved digital comparators which require a fewer number of logic gates per pair of compared digits than prior art comparators of similar type.

Still another object of the invention is to provide an improved comparator which is capable of relatively high-speed operation.

Another object of the invention is to provide an improved comparator system which can provide output signals indicating the relative magnitude between two binary numbers using fewer logic gates than prior systems.

An "$n$" digit comparator according to the present invention has a chain of $n$ transmission gates for transmitting an inequality output, and $n$ pairs of comparison gates for comparing the like significant digits of the two numbers. A first comparison gate of a pair provides an output indicating that one compared digit is greater than the other, the second gate of the same pair provides an output indicating that the one compared digit is equal to or greater than the other. The first gate of the $n$th pair is connected to an input of the $n$th transmission gate and the second gate of the $n$th pair is connected to an input of the $n$–1th transmission gate.

In operation, the signals representing the various digits are applied to the comparison gates. The outputs of the first comparison gates activate the associated transmission gates when the compared digits are unequal in one direction. The outputs of the second comparison gates enable the associated transmission gates when the compared digits are either equal or are unequal in the one direction. Thus, a number of inequality signals may be started at the same time. However, an inequality signal can reach the final transmission gate only if all higher ordered pairs of the compared digits are equal to each other or are unequal in the same one direction.

A feature of the invention is that an equality signal may be obtained by connecting the outputs of the $n$ pairs of comparison gates to an equality circuit having $2n$ inputs. The output of the equality circuit together with the output of the transmission gates provides an indication of the relative magnitudes of the two numbers.

Figures 1, 2:
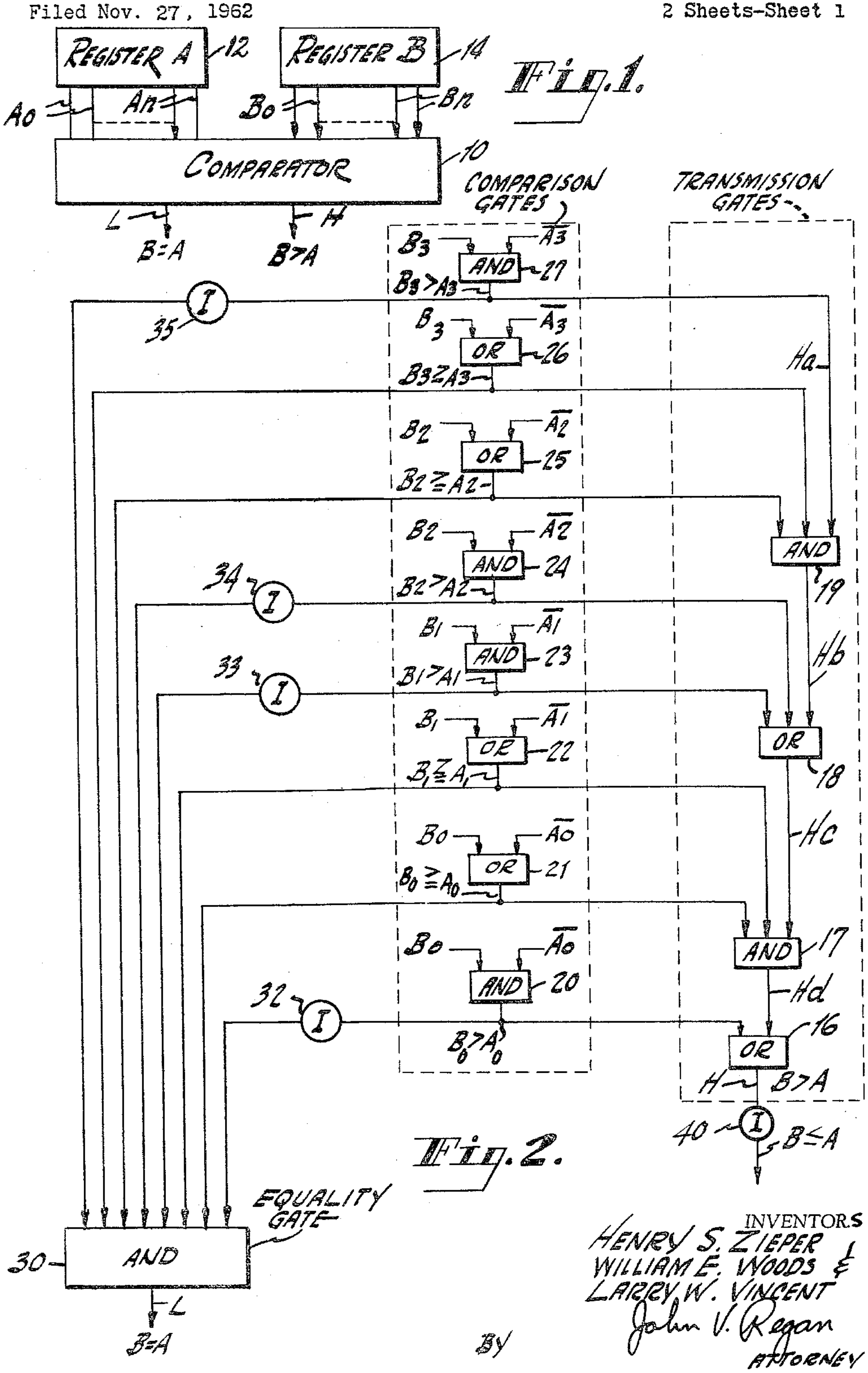
FIGURE 1 is a generalized block diagram of a comparator system.
FIGURE 2 is a block schematic diagram of a comparator system employing "and," "or" logic gates; and, FIGURE 3 is a block diagram of a comparator system according to the invention using transistor logic gates.

In the system of FIGURE 1, a comparator 10 is arranged to compare two $n$ digit binary numbers supplied from an A register 12 and a B register 14. Each of the registers, for example, may be a flip-flop register having $n$ flip-flops, one for each of the binary digits of the number stored in the register. The presence of a binary "1" digit in any flip-flop is indicated by, say, a relatively high level on the "1" output and a relatively low level on the "0" output. The presence of a binary "0" digit in any flip-flop is indicated by a relatively low "1" output and a relatively high "0" output. In the drawing the "1" and "0" outputs of a flip-flop are indicated by the unbarred and barred letters $A, \bar{A}$ and $B, \bar{B}$, respectively. The particular register stage is indicated by the number adjacent to the letter. The pairs of "1" and "0" signals from both the A and B registers are applied to the comparator 10 which provides a first output signal H when one of the numbers, for example B, has a larger magnitude than the number A. A second output signal L is provided when the number in register B is equal to the number in register A. The two signals H and L then, if desired, can be combined by any suitable circuit to provide a third signal indicating that the number B is less than the number A. That is, when both H and L signals are "0," then $B<A$.

Considering now the inequality relation between two binary numbers, if the most significant digits are first examined and found to be dis-similar, then it is immediately apparent, without examining any of the remaining digits, that one of the two numbers is greater in magnitude than the other. If the two most significant digits are equal, then the next most significant digits are examined; an inequality between these digits then determines the magnitude relation between the two numbers. The process is continued in similar manner proceeding from the most significant to least significant digits until the lowest order pair are considered. If all the digits are equal, then the two numbers are equal in magnitude.

Equation 1 is an expression in Boolean form which is a result of the above statement concerning the inequality relation. It is assumed that the digits $A_0,B_0$ are the most significant, $A_1,B_1$ the next most significant, etc.

$$
\begin{aligned}
(1)\quad H= & B_0\bar{A}_0 \\
& +(B_0+\bar{A}_0)\underline{(B_1+\bar{A}_1)}B_1\bar{A}_1 \\
& +(B_0+\bar{A}_0)(B_1+\bar{A}_1)B_2\bar{A}_2 \\
& +(B_0+\bar{A}_0)(B_1+\bar{A}_1)(B_2+\bar{A}_2)\underline{(B_3+\bar{A}_3)}B_3\bar{A}_3 \\
& +(B_0+\bar{A}_0)(B_1+\bar{A}_1)(B_2+\bar{A}_2)(B_3+\bar{A}_3)B_4\bar{A}_4 \\
& +(B_0+\bar{A}_0)(B_1+\bar{A}_1)(B_2+\bar{A}_2)(B_3+\bar{A}_3)(B_4+\bar{A}_4)\underline{(B_5+\bar{A}_5)}B_5\bar{A}_5 \\
& +(B_0+\bar{A}_0)(B_1+\bar{A}_1)(B_2+\bar{A}_2)(B_3+\bar{A}_3)(B_4+\bar{A}_4)(B_5+\bar{A}_5)B_6\bar{A}_6 \\
& + - - - - -
\end{aligned}
$$

In Equation 1, an "or" function is indicated in conventional fashion by a plus (+) sign to indicate logical addition, and an "and" function is indicated by placing the A and B terms next to each other without any sign to indicate logical multiplication. The three underlined terms $(B_1+\bar{A}_1)$, $(B_3+\bar{A}_3)$ and $(B_5+\bar{A}_5)$ are redundant in the terms in which they appear. These terms are included in Equation 1 to provide for symmetry in the expression so that it may be simplified.

Equation 1 can be written in a more generalized form as Equation 2 below which is the same expression in "nested" form.

$$(2)\ H=B_0\bar{A}_0+(B_0+\bar{A}_0)(B_1+\bar{A}_1)[B_1\bar{A}_1+B_2\bar{A}_2+(B_2+\bar{A}_2)(B_3+\bar{A}_3)[B_3\bar{A}_3+B_4\bar{A}_4+(B_4+\bar{A}_4)(B_5+\bar{A}_5)[B_5\bar{A}_5+B_6\bar{A}_6+-----$$

FIGURE 2 is a schematic diagram of a comparator according to the present invention which employs "and" and "or" logic gates. Each of these gates is well known in the art and each may comprise a conventional diode gate. Suitable circuits are described, for example, in a text by R. K. Richards, entitled "Digital Computer Components and Circuits," Chapter 2, published by D. Van Nostrand Company, Inc., 1957. The "and" gate provides a "1" output, say, relatively high, when and only when all of the input signals are simultaneously present. A high level input indicates the presence of a "1" at that input. The "or" gate provides a relatively high output when any one or more of its input signals is present. For convenience of drawing, the comparator is shown as comparing two four digit binary numbers $A_0$–$A_3$ and $B_0$–$B_3$ although the extension to $n$ digit binary numbers is possible by continuing the sequence of gates to include all the "$n$" digits.

The comparator has a set of four transmission gates 16, 17, 18 and 19 and a set of eight comparison gates 20–27. The transmission gates, beginning with gate 16, are alternately of the "or" and "and" gate types. The comparison gates, beginning with gate 20, alternate between "and" and "or" gate types. That is, a comparison "and" gate is connected to a transmission "or" gate and a comparison "or" gate is connected to a transmission "and" gate except for the comparison "and" gate 27. Since the gate 27 compares the least significant digits $A_3$,$B_3$ of the numbers, then the comparison process ends at this gate. However, if there were lower significant digits, then a transmission "or" gate would be provided between the comparison gate 27 and the transmission "and" gate 19 to examine the lower order digits.

The inequality signal H is provided by the "or" gate 16 which combines the outputs of "and" gate 20 of the comparison gates and "and" gate 17 of the transmission gates. Since the zeroth order digits of the A and B numbers are the most significant, when the output of "and" gate 20 is high indicating that $B_0>A_0$, then it is immediately known that the number B is the greater. The high output from gate 20 is transmitted through "or" gate 16 of the transmission gates to change the H output from its normally low level to a high level. If the output of comparison gate 20 is low, then the next lower order digits $A_1,\bar{A}_1$ and $B_1,\bar{B}_1$ are considered. The output of "or" gate 21 is applied as an enabling input to the transmission "and" gate 17 when the $B_0$ digit is equal to or greater than the $A_0$ digit. The next most significant digits $B_1$ and $A_1$ are compared in comparison gates 22 and 23. The comparison "or" gate 22 provides a high output when $B_1$ is equal to or greater than $A_1$. The gate 22 output is applied as a second enabling input to transmission "and" gate 17. The comparison "and" gate 23 provides a high output when $B_1$ is greater than $A_1$. This high output is passed by transmission "or" gate 18 to activate "and" gate 17 whose output is passed by "or" gate 16 to provide a high level H signal.

It is apparent that if the $B_1$ and $A_1$ digits are equal, then "and" gate 19 operates to provide an output signal when an inequality in the one direction $B_j>A_j$ occurs between the next most significant digits $A_2$ and $B_2$, and so on. Note that the comparison gates are paired with one gate of the pair being an "and" gate and the second gate of the pair being an "or" gate. Also, note that a minimum time is required to transmit an inequality signal from any one pair of digits to the output lead H. Thus, assuming both A and B numbers are applied to the comparator at the same time, then all the comparison gate outputs are applied to the transmission gates at the same time. In the worst case, when all digits except the least significant are equal, the inequality signal would have to traverse a total of only $n$ transmission gates before it appeared at the output H. That is, only $n$ gate delays are necessary in the worst case. In most instances, the output H is available in a much shorter time period.

As discussed above, in many applications it is also desirable to provide signals which indicate the relative magnitude between the two numbers. The relative magnitude indication can be provided by a second output signal A=B, which in the comparator of FIGURE 2 is provided by an equality gate 30. Gate 30 is a $2n$ input "and" gate which provides an output B=A. Each different one of the gate 30 inputs is connected to the output of a separate one of the comparison gates 20–27. The comparison "or" gates 21, 22, 25 and 26 are directly connected to the equality "and" gate 30; the comparison "and" gates 20, 23, 24 and 27 are connected to equality gate 30 by way of respective inverters 32–35. An inverter is indicated in the drawing as a circle with a capital I inscribed. An inverter operates to change one level input signal to the opposite level. Suitable inverter circuits are well known in the art, for example a common emitter transistor amplifier circuit.

Inverter 32 provides a high output when the function $\overline{(B_0\cdot\bar{A}_0)}$ is true. This function is equivalent to the function $(\bar{B}_0\cdot A_0)$ (De Morgan's theorem). Accordingly, the output $(\bar{B}_0+A_0)$ "and" the output $(B_0+\bar{A}_0$ from "or" gate 21 together correspond to both conditions when the $A_0$ and $B_0$ digits are equal, i.e., both "0" or both "1." The remaining inverters 33, 34 and 35 similarly convert the outputs of "and" gates 23, 24 and 27 to the corresponding "or" function. Equality gate 30 normally provides a low output which changes to a high output only when all like significant A and B digits are equal.

An output signal indicating $B\lesseqgtr A$ can be obtained by connecting an inverter 40 to the H output lead. The signal indicating $B<A$ can be obtained by inverting the output of an "or" gate whose inputs are $B>A$ and $B=A$, gates 16 and 30.

Figure 3:
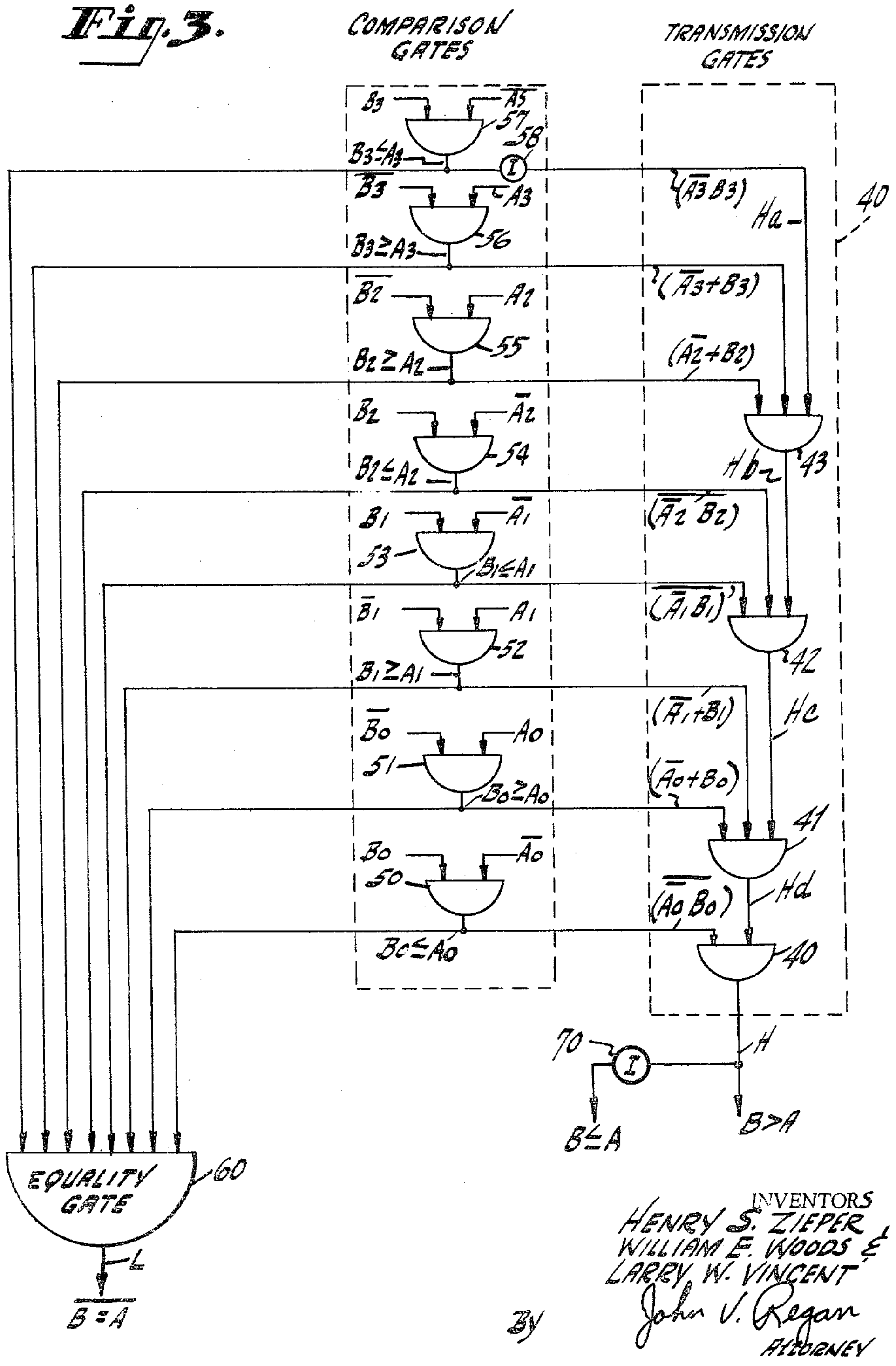

A schematic diagram of another embodiment of a comparator system according to the invention is shown in FIGURE 3. The same type of gate is used in FIGURE 3 for all the logic gates. For example, the logic gates may be transistor gates having inputs X and Y and producing an output $\overline{XY}$. This type logic gate is normally known in the art as a NAND gate and is described, for example, in a text entitled "Design of Transistorized Circuits for Digital Computers" by A. I. Pressman, published by J. F. Rider, Inc., 1959. Other suitable gates for performing the NAND function also may be used, for example, diode transistor logic gates.

The two numbers to be compared again are assumed to have four digits $A_0$–$A_3$ and $B_0$–$B_3$ with the zeroth order digits being the most significant. A series of four transmission gates 40, 41, 42 and 43 is provided together with a group of eight comparison gates 50–57. One comparison gate of a pair, for example gate 50 of the pair 50–51, is connected to one of the transmission gates, in this instance gate 40, and the second comparison gate 51 of the same pair 50, 51 is connected to the next lower order transmission gate 41. The comparison gate 57 for the least significant digits $A_3$ and $B_3$ is connected by way of an inverter 58 to the first transmission gate 43. The inverter 58 is used because the comparison gate 57 provides an output $\overline{\bar{A}_3B_3}$. The inverter 58 is used to change this output to $\bar{A}_3B_3$ as required by the comparison function. However, the inverter is used only in conjunction with the least significant digits of the numbers.

The output of any one of the comparison gates may be expressed as either an NAND function or by using De Morgan's theory as its equivalent "or" function. The comparison gates 50, 53, 54 and 57 receive the true inputs from the B number digits and the complementary inputs from the A number digits. These gates correspond to the comparison "and" gates of the FIGURE 2 system. The remaining comparison gates 51, 52, 55 and 56 receive the true inputs from the A number and the complementary inputs from the B number. These latter gates correspond to the "or" gates of the FIGURE 2 system. The output functions produced by the various comparison gates are indicated in the drawing by the expression placed adjacent to the gate output lead. It is assumed that the first comparison gate 50 used to compare the most significant digits performs an "and" type function and directly transmits an inequality output via the final transmission gate when the B digit is greater than the A digit. The next pair of comparison gates 51 and 52 provide activating signals to the next lower order transmission gate 41 when $B_0 \geqq A_0$ or $B_1 \geqq A_1$. The next two comparison gates 53 and 54 provide activating signals for the transmission gate 42 when $B_1 \leqq A_1$ or $B_2 \leqq A_2$, and so on.

Equations 3, 4, 5 and 6 below define the various signals $H_A$, $H_B$, $H_C$ produced by the respective transmission gates, and Equation 7 defines the desired inequality output signal H.

$$(3) \qquad H_A = B_3\overline{A}_3$$

$$(4) \qquad \overline{H_B = (B_2+\overline{A}_2)(B_3+\overline{A}_3)B_3\overline{A}_3}$$

$$(5) \qquad H_C = \overline{(B_1\overline{A}_1)(B_2\overline{A}_2)[(B_2+\overline{A}_2)(B_3+\overline{A}_3)B_3\overline{A}_3]}$$
$$= [B_1\overline{A}_1 + B_2\overline{A}_2 + (B_2+\overline{A}_2)(B_3+\overline{A}_3)[B_3\overline{A}_3]]$$

$$(6) \qquad \overline{H_D = (B_0+\overline{A}_0)(B_1+\overline{A}_1)[B_1\overline{A}_1 + B_2\overline{A}_2} \; \overline{+(B_2+\overline{A}_2)(B_3+\overline{A}_3)[B_3\overline{A}_3]]}$$

$$(7) \qquad H = \overline{(B_0\overline{A}_0)\{(B_0+\overline{A}_0)(B_1+\overline{A}_1)[B_1\overline{A}_1 + B_2\overline{A}_2} \; \overline{+(B_2+\overline{A}_2)(B_3+\overline{A}_3)[B_3\overline{A}_3]]}$$
$$= B_0\overline{A}_0 + (B_0+\overline{A}_0)(B_1+\overline{A}_1)[B_1\overline{A}_1 + B_2\overline{A}_2 + (B_2+\overline{A}_2)(B_3+\overline{A}_3)[B_3\overline{A}_3]]$$

An indication of equality of the two compared numbers is provided by an eight input equality gate 60 which is directly connected to each of the comparison gate inputs. The equality gate may be the same as that used for the comparison and transmission gates. It is to be noted than an inverter is not necessary between the comparison gates and the equality gate 60 since the terms $\overline{A}_0B_0$ and $A_0\overline{B}_0$ are provided directly by the pair of comparison gates 50 and 51, and so on. It should also be noted that the first gate of the comparison gate pair receives the signals $\overline{A}$,B and the second gate of the same pair receives the signals A,$\overline{B}$.

Again, it should be noted that the inequality signal H is provided with a relatively short time delay. Thus, assuming the A and B number signals are applied to the comparator at the same time, the various H signals are directly transmitted via the transmission gates 40–43 to the output H. At the same time, the equality gate 60 receives the outputs of the comparison gates 50–57 to provide the equality output signal L. (Note that this equality signal is of the opposite polarity to assumed reference state.) A positive indication that B is equal to or less than A can be provided, if desired, by inverting the H output signal in an inverter 70.

What is claimed is:

1. A comparator for comparing two binary numbers A and B each of *n* digits comprising an ordered chain of *n* transmission gates each having inputs and an output and connected in series least significant to most significant by connecting said output of any one transmission gate to a said input of the next higher significant transmission gate,

*n* pairs of comparison gates each having inputs and an output for comparing like significant pairs of said A and B digits, one gate of a pair providing an output indicating a difference between said compared digits and the other gate of the same pair providing an output indicating said difference or an equality between said compared digits, the output of said one gate of said *n*th pair being connected to an input of said *n*th transmission gate, and the output of said other gate of said *n*th pair being connected to an input of the *n*–1th transmission gate.

2. A comparator as recited in claim 1, wherein said transmission gates beginning with the highest order are alternately "or" and "and" gates, and wherein said one comparison gate is an "and" gate and said other comparison gate is an "or" gate.

3. A comparator as recited in claim 1, wherein each of said transmission and comparison gates is of the same type, further comprising means for applying the true and complementary signals of said B and A numbers, respectively, to said one comparison gate of said pairs, and means for applying the complementary and true signals of said B and A numbers, respectively, to said other comparison gate of said pairs.

4. A comparator as recited in claim 1, including a further gate having 2*n* inputs, and means connecting each of said comparison gate outputs to a different one of said inputs.

5. A comparator as recited in claim 2, including a further gate having 2*n* inputs, means directly connecting said comparison "or" gate outputs to a different one of said inputs and separate inverter means connecting said comparison "and" gate outputs to a different one of the remaining ones of said further gate inputs.

6. A comparator for comparing the two sets of binary numbers each of *n* digits comprising

*n* transmission gates each having inputs and an output, a separate pair of comparison gates for each pair of like significant digits of said numbers, one gate of a pair combining a true signal of a digit of one number and the complement digit of the other number, and the other gate of the same one pair combining the true digit of said other number and the complement digit of said one number, said transmission gates being connected to each other in a sequence by connecting said output of the *n*–1th transmission gate to a said input of the *n*th transmission gate, one of said gates of a pair being connected to one of said transmission gates and the other gate of the same one pair being connected to the next preceding transmission gate.

References Cited by the Examiner

UNITED STATES PATENTS

| | | | |
|---|---|---|---|
| 2,885,655 | 5/1959 | Smoliar | 340—146.2 X |
| 2,900,620 | 8/1959 | Johnson | 340—146.2 X |

ROBERT C. BAILEY, *Primary Examiner.*

MALCOLM A. MORRISON, *Examiner.*